United States Patent
Fanta et al.

(10) Patent No.: US 6,461,999 B1
(45) Date of Patent: Oct. 8, 2002

(54) STARCH-CONTAINING LUBRICANT SYSTEMS FOR OIL FIELD APPLICATIONS

(75) Inventors: George F. Fanta, Morton, IL (US); Herman M. Muijs, Foster City, CA (US); Kenneth Eskins, deceased, late of Laura, IL (US), by Sandra Eskins, legal representative; Frederick C. Felker, Mortin; Selim M. Erhan, River Forest, both of IL (US)

(73) Assignees: The United States of America as represented by the Secretary of Agriculture, Washington, DC (US); Shrieve Chemical Products, The Woodlands, TX (US)

( * ) Notice: Subject to any disclaimer, the term of this patent is extended or adjusted under 35 U.S.C. 154(b) by 0 days.

(21) Appl. No.: 09/820,150

(22) Filed: Mar. 28, 2001

(51) Int. Cl.$^7$ .......................... C10M 111/04; C09K 7/00
(52) U.S. Cl. ..................... 508/216; 508/472; 508/591; 507/111
(58) Field of Search .......................... 507/111; 508/216

(56) References Cited

U.S. PATENT DOCUMENTS

| | | |
|---|---|---|
| 5,176,841 A | 1/1993 | Wallfahrer et al. |
| 5,435,928 A | 7/1995 | Beck |
| 5,587,354 A | 12/1996 | Duncan |
| 5,658,859 A * | 8/1997 | Burba, III et al. .......... 507/111 |
| 5,676,994 A * | 10/1997 | Eskins et al. .............. 426/602 |
| 5,882,713 A | 3/1999 | Eskins et al. |

FOREIGN PATENT DOCUMENTS

| | | |
|---|---|---|
| WO | WO9905235 A1 | 2/1999 |
| WO | WO02/12674 A | 2/2002 |

* cited by examiner

*Primary Examiner*—Ellen M. McAvoy
(74) *Attorney, Agent, or Firm*—M. Howard Silverstein; Curtis P. Ribando; John D. Fado

(57) ABSTRACT

Lubricating additives for drilling fluids are prepared from semi-solid highly viscous and/or high molecular weight lubricants, such as polyalkylenes (e.g., polybutene), by steam jet cooking a mixture of starch, water, and the lubricant in order to uniformly suspend micrometer-sized lubricant droplets in an aqueous starch matrix. These additives avoid the need for toxic emulsifiers, surfactants, or short-chain hydrocarbon solvents for dispersing the lubricants. They impart lubricity to drilling fluids (muds) and also inhibit fluid loss in geological formations by enhancing the filtration control properties of the fluid.

22 Claims, No Drawings

STARCH-CONTAINING LUBRICANT SYSTEMS FOR OIL FIELD APPLICATIONS

BACKGROUND OF THE INVENTION

1. Field of the Invention

This invention relates to the use of compositions comprised of starch and semi-solid, highly viscous and/or high molecular weight lubricants having a pour-point within the range. of about 20° C. to about −25° C. as additives in drilling fluids. Compositions are prepared by a continuous steam jet cooking process that is carried out in the complete absence of surfactants or emulsifiers. Starch is dissolved in water during the jet cooking process; and a water-immiscible (oil-based; oleaginous-based) lubricant is reduced to micron-sized droplets that remain suspended in the starch-water matrix and do not separate or coalesce, even after the dispersion is dried. Dried compositions are easily dispersed in water and impart improved lubricity to drilling fluid compositions. Uncooked, granular special functional starches, e.g. high-temperature fluid-loss starches, may also be blended into these compositions before drum drying to enhance fluid loss properties.

2. Description of the Prior Art

Starch is a high molecular weight natural polymer composed of repeating 1,4-alpha-D-glucopyranosyl units (anhydroglucose units or AGU) and is typically a mixture of linear and branched components. The linear component (amylose) has a molecular weight of several hundred thousand, while the molecular weight of branched amylopectin is on the order of several million. Although normal dent cornstarch contains about 25% amylose, commercial cornstarch varieties are available that range in amylose content from 0% (waxy cornstarch) to about 70% (high amylose cornstarch).

Starch occurs in living plants as discrete granules ranging from about 5 to 40 micrometers in diameter, depending upon the plant source. Starch, as isolated in its native state, is insoluble in water at room temperature because of hydrogen bonding between polysaccharide macromolecules and areas of crystallinity within the starch granule. When a water solution of starch is heated, granules initially take up water with limited swelling. Then, at a definite temperature (typically about 70° C.), granules swell rapidly and irreversibly; therefore, areas of crystallinity within the granule are lost. The temperature at which this occurs is referred to as the gelatinization temperature.

Near the gelatinization temperature, a measurable percentage of the starch, in particular the amylose component, becomes soluble and diffuses out of the granule matrix. As the temperature is increased beyond about 70° C., a greater percentage of the starch becomes soluble. Granules become highly swollen, until, at a temperature of about 90–100° C., a viscous dispersion of starch in water is obtained. However, despite the outward appearance of solubility, starch is only partially water soluble and exists largely as highly swollen granules and granule fragments that may be easily separated from starch solution by centrifugation.

True solutions of starch in water are difficult to prepare using conventional cooking techniques and require the application of specialized techniques, such as autoclaving at elevated temperatures and steam pressures. Steam jet cooking is another technique for preparing starch solutions, which is simpler and more economical than autoclaving, and is suitable for continuous processing. Because of these processing advantages, jet cooking has been used for decades to prepare starch solutions for commercial applications. The method of steam jet cooking involves pumping a water slurry of starch through an orifice located in a heating chamber (i.e., hydroheater), where the starch slurry contacts a jet of high-temperature, high-pressure steam. There are two basic steam jet cooker designs used commercially, and these are discussed in an article by R. E. Klem and D. A. Brogly in *Pulp & Paper,* Vol. 55, 1981, pages 98–103. In the first of these designs (which is referred to as thermal jet cooking) the amount of steam is carefully controlled to achieve complete steam condensation during the cooking process (i.e., little or no excess steam passes through the cooker). In the second of these designs (which is referred to as excess steam jet cooking), the steam entering the hydroheater exceeds the amount required to achieve the required cooking temperature and pressure, thus allowing considerable amounts of excess steam to pass through the cooker along with the cooked starch solution. The intense turbulence caused by the passage of this excess steam through the hydroheater promotes mechanical shearing and degradation of starch molecules, especially those having the highest molecular weight, and it also produces starch solutions with reduced viscosity (see Dintzis & Fanta, *Journal of Applied Polymer Science*, Vol. 62, 1996, pages 749–753). The high degree of turbulence and mechanical shear of the excess steam jet cooking process also converts the water-immiscible lubricant phase to a homogeneous aqueous dispersion of micrometer-sized oleaginous droplets. These unique aqueous starch-oil dispersions form the basis for the lubricant compositions of this invention.

An inherent property of starch pastes and solutions is their tendency to form gels on cooling, and this property is commonly referred to as retrogradation. Retrogradation is caused by aggregation of starch molecules through hydrogen bonding and crystallization. The tendency of starch solutions to retrograde and form gels increases with the amylose content of the starch, because amylose is a straight chain polymer with little or no branching. Although retrogradation has also been observed in amylopectin solutions, retrogradation is much slower with amylopectin, and is generally observed only after solutions have been allowed to stand for prolonged periods of time.

U.S. Pat. Nos. 5,676,994 and 5,882,713, which are herein incorporated by reference, describe the preparation of starch-oil compositions by mixing starch, water and oil at room temperature and then passing this mixture through an excess steam jet cooker. The resulting jet cooked compositions are stable with respect to separation and coagulation of oil droplets and are comprised of microscopic droplets of oil, about 1–10 micrometers in diameter, uniformly distributed in the starch-water phase. No emulsifying agents, dispersing agents or surface-active agents are used in the process. The amount of oil in these formulations normally does not exceed about 50% of the total product, and preferred compositions are comprised of about 20–40 parts of oil per 100 parts of starch (17–29% oil, by weight). If the oil content is held within this preferred range, jet cooked compositions are easily dried, using techniques such as drum drying, to yield outwardly dry, flake-like products that can be easily reduced in size by milling, and that exhibit no separation of oil from the dried starch matrix. The dried, jet cooked compositions hydrate rapidly and are easily dispersed in water to form smooth, stable, lump-free dispersions that are similar in properties and appearance to undried dispersions freshly collected from the jet cooker. Water dispersions do not phase separate into their oil and aqueous components on prolonged standing because of a thin layer or shell of starch that spontaneously forms around each oil droplet during the jet cooking process. Scanning electron micrographs of these thin starch shells and possible reasons for their formation are discussed in an article by Fanta et al. in *Carbohydrate Polymers*, Vol. 39, 1999, pages 25–35.

When oil and gas wells are drilled, fluid formulations with a multitude of properties, including lubricity, are pumped down the well through the drill string and out through nozzles in the drill bit, so that the drilling fluid circulates upward through the annular space between the rotating drill string and the rock formation. The functions of these drilling fluids or "muds" are to cool and lubricate the bit and drill string, to carry the cuttings from the drilling process to the surface, to control and reduce fluid loss into the rock formations, and to support and protect the bore hole until the metal casing can be cemented in place (i.e., create a stable hole). Drilling fluid systems designed to alleviate problems associated with bore hole instability in shale are described in U.S. Pat. No. 5,925,598 (Mody & Fisk, Jr.).

Drilling fluids must also be economical and must not endanger the health and safety of personnel or be a burden to the environment. Mud lubricity (to achieve minimum torque and drag) and mud toxicity (for wells in environmentally sensitive areas, such as offshore drilling) are major concerns when selecting a drilling fluid formulation. Most drilling fluids may be grouped into two major categories: water-based or oleaginous-based. The majority of drilling fluids used today are water-based, i.e., they contain water as the continuous external phase. Although oleaginous-based drilling fluids including the so-called synthetic-based fluids do have performance advantages, drawbacks are higher costs and difficult environmental compliance in specific areas of the world. The lubricant compositions described in this invention are environmentally friendly and are used primarily in water-based drilling fluids.

The lubricity of a drilling fluid is an important factor in the economics of well drilling and is measured by determining the effect of the fluid upon the coefficient of friction between a moving part, such as the drill string, and a surface in contact with the moving part. The lower the coefficient of friction, the greater the lubricity. The lubricity of a drilling fluid determines the fluid's ability to lower torque and drag forces during the drilling operation and increases the speed of drilling approaching the high rate of penetration observed with the continuous phase oleaginous fluids. Organic, oil-based lubricants are often added to water-based drilling fluids to reduce the coefficient of friction. Reduction of friction during drilling is particularly important in drilling operations where the well bore is not vertical. Emulsifiers or surfactants are typically added to drilling fluids to keep these oil-based, water-insoluble lubricant components suspended as droplets in the water-based fluids and to prevent their separation and coalescence. These emulsifiers can increase the toxicity and irritation level of the fluids.

The following patent documents are examples of prior art related to the addition of water-immiscible liquid lubricants to water-based drilling fluids to enhance their lubricity:

U.S. Pat. No. 5,945,386 (Alonso-DeBolt et al.) describes glycol and glycol ether products, preferably comprising the reaction product between 2-ethylhexanol and the epoxide of 1-hexadecene. These products enhance the lubricity of water-based drilling fluids. When they are used as spotting fluids, they reduce the time required to release stuck pipe.

U.S. Pat. Nos. 5,942,467 & 5,843,872 (Rayborn, Sr. & Rayborn) describe a drilling fluid composition prepared from a carbon black/asphaltite/lignite mixture and a fish oil/glycol mixture. Surfactants are added to these compositions.

U.S. Pat. No. 5,869,434 (Mueller et al.) describes the use of linear hydrocarbon compounds, unsaturated in the alpha position, as the oil phase or as part of the oil phase in drilling fluid formulations. Emulsifiers are used in these water-based formulations.

U.S. Pat. Nos. 5,851,958 and 5,605,879 (Halliday & Schwertner) describe the use of olefinic hydrocarbons as lubricants, rate of penetration enhancers, and spotting fluids in water-based drilling fluids. Spotting fluids preferably include functional additives, such as emulsifiers, viscosifiers, surfactants, and/or brine.

U.S. Pat. No. 5,837,655 (Halliday) describes the use of purified paraffins, selected from the group consisting of white oils and food grade paraffins, as lubricants, rate of penetration enhancers, and spotting fluids in water-based drilling fluids. When used in spotting fluids, paraffins are supplemented with additives such as emulsifiers, viscosifiers, surfactants, and/or brine. When used as lubricants and/or rate of penetration enhancers, the paraffins are preferably used alone or in combination with surfactants.

U.S. Pat. No. 5,707,940 (Bush & Jahnke) relates to oil-in-water drilling fluid formulations comprising brine, at least one triglyceride, at least one alcohol, at least one emulsifier, and at least one sulfurized composition.

U.S. Pat. No. 5,700,767 (Adams) describes a lubricant system comprising surfactant (preferably aluminum stearate), viscosifier (oil-compatible bentonite or polyacrylamide), filming amine, activator (petroleum solvent, coconut oil, terpene, xylene, mineral oil, turpentine, d-limonene or mixtures thereof), and diluent (diesel fuel, fuel oil, gasoline, naphtha, kerosine, or jet fuel). When the lubricant formulation is dispersed in the drilling fluid, the filming amine coats the metal; and friction associated with the drilling operation causes formation of a lubricious emulsion.

U.S. Pat. No. 5,593,954 (Malchow, Jr.) describes drilling fluid compositions containing a mixture of brine, an oil-soluble friction modifier, and an emulsifier. An oil carrier may be used in combination with the friction modifier and emulsifier to form the final oil phase.

U.S. Pat. No. 5,587,354 (Duncan, Jr.) describes a drilling fluid additive comprising a monocyclic terpene (e.g., d-limonene) and an oil, such as mineral oil or vegetable oil. The additive is mixed into a water-based drilling fluid in the range of 1–8% by volume and provides improved rate of penetration, high lubricity and low toxicity.

U.S. Pat. No. 5,248,664 (Hale & Blytas) describes water-based drilling fluid formulations that contain an alcohol such as glycerol to depress the freezing point of the formulation, to inhibit the formation of gas hydrates, to prevent shale dispersion, and to reduce drilling fluid loss. Oils are added to the formulation to increase lubricity, and emulsifiers are used to keep the water-insoluble oils uniformly suspended in the water phase.

U.S. Pat. No. 4,517,100 (Nance & Calkins) describes water-based drilling fluids containing a lubricant composition comprised of a chlorinated component (chlorinated normal paraffins, chlorinated esters of fatty acids, chlorinated waxes, chlorinated olefins, or mixtures thereof) and a sulfurized component (sulfurized fatty acid, sulfurized fatty acid esters, sulfurized polymerized fatty acids, sulfurized olefins, or mixtures thereof).

U.S. Pat. No. 4,409,108 (Carney et al.) describes lubricants for water-based drilling fluids that contain up to about 5% (by weight) of an additive comprising a mixture of an odor-masking agent, a low molecular weight alcohol, and an ester of oleic acid.

U.S. Pat. No. 4,181,617 (Elrod et al.) describes an aqueous drilling fluid containing a lubricant consisting essentially of the reaction product of a fatty vegetable oil with 4,4'-thiodiphenol.

U.S. Pat. No. 3,761,410 (Mondshine et al.) describes water-based drilling fluids prepared by incorporating vegetable oils, animal fats, fatty acids, fatty acid esters, fatty amides and their sulfurized or sulfated reaction products. Formulations also contain a water-insoluble alcohol having 4–15 carbon atoms.

In addition to liquid lubricants, micrometer-sized solid particles or beads may also be added to water-based drilling fluids to increase their lubricity. Some representative examples of this type of lubricant system are: (1) Abrasion- and fracture-resistant, thermally stable and chemically inert ceramic spheres (U.S. Pat. No. 5,792,727, to Jacobs); (2) Plastic beads, for example, those made from a copolymer of divinyl benzene and styrene (U.S. Pat. No. 4,369,655, to Scearce; U.S. Pat. No. 4,063,603, to Rayborn); (3) Plastic-coated magnetic particles in bead form, to facilitate the removal and recycling of these bead compositions (U.S. Pat. No. 4,269,279, to House); (4) Chemically-resistant, lime-silica glass beads (U.S. Pat No. 4,123,367, to Dodd); (5) Resilient graphitic carbon particles (U.S. Pat. No. 5,826,669, to Zaleski et al.); (6) Cellulose, peat or bagasse, containing absorbed oil-based liquid lubricants (U.S. Pat. No. 4,356,096, to Cowan et al.); (7) Mixtures of graphite, silicate and silicone materials (U.S. Pat. No. 5,401,719, to DeBeer).

In many drilling operations, pores and fractures in permeable geological formations can allow drilling fluid to escape or filter into the areas surrounding the subterranean borehole. Fluid loss is reduced when an impervious filter cake is deposited on the sides of the bore hole, and the thickness of this filter cake is usually proportional to the volume of fluid lost, i.e., the thinner the filter cake, the lower the fluid loss. Maintaining the diameter of the bore hole being drilled is critical to the success of the drilling operation. If fluid loss is high, the filter cake will be thick, and the desired diameter of the borehole will be reduced, thus increasing frictional forces and increasing the possibility of binding and sticking of the drill string. Additives are commonly added to drilling fluids to minimize and control this loss of fluid, i.e., to provide filtration control. Examples of some commonly used fluid loss additives are bentonite clays, starches, polymers, lignites, and surfactants. Particularly valuable are water-soluble or water-dispersable polymers that are capable of adding some viscosity to a water-based drilling fluid in addition to providing the necessary filtration control. Drilling fluids must have sufficient viscosity to suspend cuttings and weighting materials when circulation of the drilling fluid is stopped. Preferred polymers for these applications are water-soluble starches and their derivatives, water-soluble gums and their derivatives, and water-soluble cellulose derivatives.

The following patent documents are examples of prior art related to the addition of additives to water-based drilling fluids to enhance their fluid loss and rheological properties:

U.S. Pat. No. 5,919,738 (Norfleet et al.) describes aqueous drilling fluids comprising brines that contain water-insoluble hydrated colloidal complexes to improve fluid loss control and rheological properties. Water-insoluble hydrated colloidal complexes are formed when nonionic colloid-forming materials form complexes with the salts of alkaline earth materials (e.g., calcium chloride and/or calcium bromide) that are used to form the brine. Preferred nonionic colloid-forming materials are polyethylene glycols or compounds that contain a high molar concentration of ethylene oxide.

U.S. Pat. No. 5,789,349 (Patel) describes fluid loss control agents for water-based drilling fluids that are prepared by copolymerizing acrylamide with 2-acrylamido-2-methylpropane sulfonic acid (AMPS) in the presence of the cross-linking monomer methylene-bis-acrylamide.

U.S. Pat. No. 5,134,118 (Patel) describes the use of water-soluble polymers prepared from AMPS and N,N-dimethylacrylamide to increase viscosity and improve fluid loss control in water-based drilling fluids.

U.S. Pat. No. 5,009,267 (Williamson et al.) describes fluid loss control additives prepared from blends of two or more modified or cross-linked starches, or blends of one or more natural starches with one or more modified starches.

U.S. Pat. No. 4,822,500 (Dobson, Jr. et al.) describes fluid loss control agents prepared from blends of xanthomonas gum and cross-linked hydroxypropyl starch.

U.S. Pat. No. 4,547,299 (Lucas et al.) describes the use of water-soluble copolymers prepared from N,N-dimethylacrylamide and AMPS as fluid loss control agents. Cross-linking is optional.

U.S. Pat. No. 4,502,964 (Griddings et al.) describes the use of terpolymers prepared from AMPS, N,N-dimethylacrylamide and acrylonitrile as fluid loss additives and rheology stabilizers.

U.S. Pat. No. 4,471,097 (Uhl et al.) describes the use of water-soluble sulfonated polymers containing vinylimidazole for fluid loss control in a high temperature and high calcium water-based drilling fluid.

U.S. Pat. No. 4,652,384 (Francis et al.) describes the use of starches, that are cross-linked to a high degree, as fluid loss control agents at elevated temperatures. The cross-linked starch requires activation at elevated temperature to achieve suitable effectiveness.

U.S. Pat No. 4,422,947 (Dorsey et al.) describes a thixotropic drilling fluid that contains a cross-linked potato starch, a bacterial heteropolysaccharide, and hydroxyethyl cellulose or carboxymethyl cellulose.

U.S. Pat. No. 4,293,427 (Lucas et al.) describes the use of acrylamide-AMPS copolymers as fluid loss control agents in water-based drilling fluids. Cross-linking with cationic salts is optionally carried out.

U.S. Pat. No. 4,257,903 (Kucera et al.) describes drilling fluids containing cross-linked polysaccharide derivatives.

U.S. Pat. No. 4,090,968 (Jackson & Hartfiel) describes the use of organic derivatives of starch, such as quaternary ammonium starch derivatives, as fluid loss control additives that are stable at high temperature. These derivatives are prepared by reaction of starch with epichlorohydrin and a tertiary amine.

U.S. Pat. No. 3,956,141 (Walker) describes the addition of cationic starch products to control the fluid loss in aqueous drilling fluids that are saturated with calcium hydroxide and contain high levels of salinity.

U.S. Pat. No. 6,180,571 (Sifferman et al.) describes fluid loss control additives comprising starches which are cross-linked and have a Brabender peak viscosity of about 800–1250 Brabender units after about 40–70 minutes at about 92° C. The invention is also directed to cross-linked starches that are spray dried to further improve properties.

Some of the best-performing lubricants for drilling muds are solid, high viscosity and/or high molecular weight polymers and copolymers. These materials tend to be recalcitrant toward dispersing in aqueous drilling mud systems and require the use of relatively short-chain diluents, e.g., C10 hydrocarbon solvents, and/or emulsifiers and surfactants that can have adverse effects on handling safety (low flash point) or can lead to an increased toxicity.

SUMMARY OF THE INVENTION

This invention is based upon the discovery that lubricating additives for oil drilling fluids may be prepared with semi-solid, highly viscous and/or high molecular weight lubricants having a pour point within the range of about 20° C. to about −25° C. by: (A) preparing a mixture of starch, water, and lubricant and passing this mixture through a steam jet cooker to afford a composition comprising micrometer-sized lubricant droplets uniformly suspended in an aqueous starch matrix; (B) optionally adding uncooked starch granules to the warm, jet cooked dispersion; and (C) optionally drying this composition, preferably using a drum drier. Compositions are characterized by the following properties: (1) Starch, water, and lubricant are the only components used in the preparative process, and no emulsifiers, surfactants, or short-chain hydrocarbon solvents are required; (2) the lubricant is homogeneously dispersed in the aqueous starch solution as micrometer-sized droplets that are stable with respect to separation and coalescence; (3) dried compositions are not oily to the touch and may be readily reduced in size by grinding or milling; (4) dry compositions disperse easily in water and produce aqueous dispersions having properties similar to jet cooked lubricant dispersions that have never been dried; and (5) addition of these compositions to drilling fluids imparts lubricity to the drilling fluid and also inhibits fluid loss in geological formations by enhancing the filtration control properties of the fluid.

In accordance with this discovery, it is an object of this invention to provide a novel class of aqueous starch-based lubricant compositions for use as lubricants in drilling fluids (muds).

It is also an object of this invention to provide a novel class of dry, starch-based lubricant compositions, containing about 30% water immiscible lubricant, for use in fluids for drilling oil and gas wells. These dry compositions disperse easily in drilling mud formulations and provide aqueous dispersions having lubricity properties similar to undried jet cooked dispersions.

It is another object of this invention to provide starch-based compositions that function as lubricants in drilling fluids without addition of less desirable hydrocarbon solvents, emulsifiers, or surfactants.

It is a further object of this invention to provide starch-based compositions that not only improve the lubricity properties of drilling fluids, but also inhibit fluid loss by enhancing the filtration control properties of the fluid.

Other objects and advantages of this invention will become apparent from the following discussions.

DETAILED DESCRIPTION OF THE INVENTION

The compositions of this invention are preferably prepared from unmodified starches obtained from cereal grains, such as corn, wheat and rice, or from root crops, such as potato and tapioca. Mixtures of these starches may also be used. Modified starches may also be used to obtain certain properties not obtainable with unmodified starches. An unmodified starch is one that has not been altered by chemical treatment or reduced in molecular weight by reaction with acids or enzymes. Since cornstarch is the least expensive of all commercially available starches, it is the preferred starch variety for use in this invention.

Starches having amylose and amylopectin components in varying proportions may be used in the preparation of these lubricant compositions. Examples of these are waxy cornstarch having an amylose content of essentially 0%, normal dent cornstarch having an amylose content of approximately 25%, and high amylose cornstarch varieties having amylose contents ranging from about 50% to 70%. Mixtures of these various starches can also be used, as well as mixtures of starch and hydrocolloid gums, such as pectin, guar, locust bean, and xanthan.

The ratio of amylose-to-amylopectin is a major factor in determining the physical properties of these lubricant compositions. For example, aqueous starch solutions tend to thicken and form gels (i.e., retrograde) when they are allowed to stand and cool, and this tendency to retrograde increases with increased amylose content in the starch granule. Moreover, the amount of amylose in the starch granule also affects the dispersibility and solubility of jet-cooked and drum-dried starch products when they are mixed into aqueous fluids. Starch-based lubricants prepared from waxy starch are more easily dispersed than analogous lubricant compositions prepared from amylose containing starches, and water dispersibility and solubility both decrease with increased percentages of amylose in the starch-based composition. The presence of gel particles in these aqueous starch dispersions is often advantageous in drilling fluid formulations, since these particles cause the compositions to function more efficiently as fluid loss inhibitors. Since normal dent cornstarch (which contains about 25% amylose) is the least expensive cornstarch variety and also contains sufficient amylose to produce aqueous dispersions having a significant gel particle content, normal dent cornstarch is the preferred starch for use in preparing the compositions of this invention. Although starch is preferably used in the preparation of these compositions, one may also use cereal flour, which is comprised largely of starch, but also contains the protein components of the cereal grain.

The lubricant component of these starch-based lubricant formulations may be selected from any number of water-immiscible, semi-solid or highly viscous and/or high molecular weight lubricants having a pour point within the range of about 20° C. to about -25° C. These lubricants are characterized by viscosities in the range of about 700–4500 cSt at 40° C., and are known to enhance the lubricity of drilling fluids. Examples of these lubricants include (but are not limited to) long-chain (C16 or greater) saturated hydrocarbons and olefinic hydrocarbons, organic esters, and polyalkylenes, such as polybutene. Other examples of lubricants useful in this invention are certain copolymers of α,β-unsaturated dicarboxylic acid esters and olefinically unsaturated compounds, such as disclosed in U.S. Pat. Nos. 5,176,841 and 5,435,928, both of which are herein incorporated by reference. These copolymers typically have viscosities in the range of 750–4500 cSt at 40° C. Lubricants contemplated to be within the scope of the invention must have a molecular weight of at least 280, such as the C20–C24 and also the C24–C28 alkenes. Of course, polymerized short-chain hydrocarbons, such as the aforementioned polyolefin materials and the copolymers of α,β-unsaturated dicarboxylic acid esters and unsaturated compounds would meet these limitations. As previously indicated, one particular advantage of the invention is avoidance of toxic solvents (diluents), emulsifiers, and surfactants that are often used in drilling muds, particularly in conjunction with the high molecular weight, extremely viscous lubricants, including various viscous polyalkylenes, e.g. polybutene. For instance, hydrocarbon solvents or diluents, with an alkyl chain length in the range of C10–C12 are less desirable for safety handling (low flash point) and environmental (aquatic toxicity) considerations. Therefore, hydrocarbons having a chain length of less than 16 carbons are specifically excluded as lubricants for use herein.

Compositions of this invention are prepared from starch and lubricant in the relative amounts cited in U.S. Pat. Nos. 5,676,994 and 5,882,713, which have been incorporated by reference. The amount of lubricant may range from about 5–100 parts per 100 parts of starch (by weight). The upper practical limit for lubricant content of the final composition is dictated by the point at which the water-immiscible lubricant begins to coalesce and separate from the aqueous jet-cooked dispersion. If the starch-lubricant compositions are to be dried (for example, by drum drying), the upper practical limit for the amount of lubricant in the final composition is dictated by the point at which the lubricant separates from starch during the drying process (for example, on the heated drums of the drum drier). Preferred starch-based lubricants for which the advantages of the invention are realized contain about 20 to 50 parts (by weight) of lubricant per 100 parts starch (17–33% lubricant, by weight, in the final dry composition). Higher percentages of lubricant can be used (up to equal parts of starch and lubricant, by weight) when compositions are to be used in the undried state.

The method used to prepare the compositions of this invention is to first prepare a coarse blend of starch, lubricant and water by rapidly stirring together the three components of the mixture at or near room temperature. When the stirrer is stopped, these mixtures tend to separate rapidly into an upper, water-immiscible lubricant phase and a lower phase that consists essentially of starch granules and water. It is therefore desirable to quickly pump the dispersion through the steam jet cooker while it is being stirred in order to minimize separation and loss of expensive lubricant. Passing this coarse dispersion through the steam jet cooker yields a homogeneous dispersion of micrometer-sized lubricant droplets suspended in an aqueous solution of starch. These lubricant droplets do not separate or coalesce, even after prolonged standing. To avoid the problem of separation and possible loss of lubricant prior to cooking, a preferred method of preparation is to (1) jet cook a water slurry of starch; (2) add lubricant to the resulting hot starch solution with high shear mixing; and (3) pass the resulting dispersion a second time through the steam jet cooker. Mixing the lubricant with hot, cooked starch solution prior to final jet cooking stabilizes the dispersion for a sufficiently long time period to allow it to be pumped through the cooker without separation and loss of lubricant. Mixing a small amount of jet cooked and drum dried starch into the coarse, aqueous dispersion of starch granules and lubricant provides a similar level of stabilization.

The pH of the aqueous starch-lubricant dispersion is typically in the 5–7 range, but may be optionally adjusted to any desired range by addition of acid or base. It is well known that the properties of cooked starch are highly dependent upon the pH during cooking. As the pH is reduced to a value lower than about 4, starch will suffer increasing amounts of hydrolytic degradation at the high temperature used for cooking, and the properties of the final product will thus be affected. At a sufficiently low pH, hydrolysis of starch occurs to yield glucose and other water-soluble sugars. The concentration of starch in water during steam jet cooking is typically about 10–25%, by weight; however, the upper limit is variable and is dictated by the desired viscosity of the jet cooked dispersion. Starch concentrations lower than about 10% may also be used; however, with lower solids levels, greater amounts of water must be removed if compositions are to be dried, and the expenses associated with drying will thus be increased.

Cooking is preferably carried out with an excess steam jet cooker (see R. E. Klem and D. L. Brogly, *Pulp and Paper*, Vol. 55, 1981, pages 98–103) under conditions necessary to attain complete solution in water of both the amylose and amylopectin components of starch. Starch is also reduced in molecular weight by the intense mixing and turbulence that takes place in the hydroheater at the high temperatures and pressures of the jet cooking process. Although no emulsifying or dispersing agents are used in the preparative process, jet cooking converts the lubricant component into micrometer-sized droplets that are homogeneously dispersed throughout the starch solution. Lubricant droplets do not separate and coalesce because of a thin layer or shell of starch that forms spontaneously around each lubricant droplet during the jet cooking process. These starch shells have been isolated and examined using both light microscopy and scanning electron microscopy, and this research has been published by Fanta et al. in *Carbohydrate Polymers*, Vol. 39, 1999, pages 25–35.

Although jet cooking conditions may be widely varied by one skilled in the art, conditions are typically those cited in U.S. Pat. Nos. 5,676,994 and 5,882,713. Preferred cooking conditions are in the range 130°–150° C. (20–50 psig steam) within the hydroheater portion of the cooker, with a steam line pressure of 65–70 psig entering the cooker. Pumping rate for the aqueous dispersion of starch and lubricant through a laboratory-sized cooker is about 1-liter/minute; however, substantially higher throughputs may be achieved with large, production-scale jet cooking equipment. The instantaneous release of steam pressure as the hot dispersion leaves the cooker results in an immediate temperature drop in the cooked dispersion to 100° C.

Drum drying is the preferred method for drying the compositions of this invention. Typical drum drying conditions are 30–70 psig within the drums with a drum rotation speed of about 2–6 rpm. For purposes of this invention, a product is considered to be dry when its water content is less than about 10%. Dry compositions may then be ground, milled, or pulverized to any desired particle size. Other methods of drying, such as spray drying or fluidized bed drying can also be used.

Dispersions produced by this cooking process will contain lubricant droplets having diameters ranging from less than 1-micrometer to about 50 micrometers. Typically, about 90% of these droplets will be under 10 micrometers in diameter. For purposes of this invention, droplets in this size range will be considered as being "micrometer-size". Droplet size can be controlled by varying the steam pressure and temperature used in the jet cooking process. For example, higher mechanical shear within the hydroheater, and thus a smaller average droplet size, can be achieved by increasing the steam line pressure entering the cooker. This increases the amount of excess steam passing through the hydroheater and thus increases the intensity of mixing during the jet cooking process. Subjecting cooked dispersions to repeated passes through the steam jet cooker will also decrease average droplet size. The skilled artisan will appreciate the fact that the droplet size range of the compositions of the instant invention are significantly larger than the droplet size of oils that have been emulsified by externally added emulsifiers and surfactants. This larger droplet size may be partially responsible for the excellent lubricating properties of these compositions.

The starch-based drilling fluid lubricants of the invention may be incorporated in the wet or dry state into any water-based or oleaginous-based drilling fluid (mud) as known in the art. The oleaginous-based drilling fluids include the synthetic-based fluids. The amount of dry starch-based lubricant composition added to the drilling fluid will be within the range of about 1–40 lb./barrel (0.1% to 4% v/v water-immiscible lubricant), and preferably 2–10 lb./barrel (0.2% to 1% v/v water-immiscible lubricant).

The starch-based compositions of this invention can also be formulated to inhibit fluid loss and enhance filtration control properties of the drilling fluids to which they are added. These fluid loss and filtration properties are achieved, if a minor amount of granular, uncooked starch is added to the warm (80–85° C.), freshly-cooked starch-lubricant dispersion just before it is drum dried. The amount of dry granular starch added is sufficient to provide a final starch-lubricant composition containing 10–20%, and preferably about 15% non-jet cooked starch (by weight) in the total starch-lubricant composition on a dry weight basis. Under these preparative conditions, the added granular starch becomes swollen and gelatinized (but not solubilized), because of the elevated temperature used in the drum drying process (about 130–150° C. on the surface of the drums). When the final dried compositions are dispersed in drilling fluids (muds), the added gelatinized starch remains as water-swollen, insoluble particles and thus acts as an impermeable filter cake to inhibit the passage of drilling fluid through porous rock formations.

The following examples further illustrate the invention, but do not limit the invention, which is defined by the claims.

EXAMPLES

To prepare starch-lubricant compositions, starch and water were first mixed in a Waring® blender to give an aqueous dispersion containing about 20% starch solids. The starch used was regular food grade dent cornstarch (A.E. Staley Mfg. Co., Decatur, Ill.), although comparable results can be obtained by using industrial grade starch for actual production. This starch-water mixture was then stirred continuously (to prevent settling of starch) and passed through an excess steam jet cooker. A Penick & Ford Laboratory Model steam jet-cooker operating at 1400° C. (284° F.) (40 psig steam back-pressure), with a steam line pressure of 70 psig steam, was used. The pumping rate through the cooker was about 1L/min. The hot, jet cooked dispersion was ejected from the jet-cooker at 90–95° C. (194–203° F.). Lubricant was then blended into this hot, initially-cooked starch solution using a Waring® blender. To every 100 parts of starch, 50 parts of lubricant was added. This mixture was then passed through the jet-cooker a second time and cooled to 80–85° C. Granular starch was then blended into the dispersion to provide a final dry starch-lubricant product containing 15% non-jet cooked starch (by weight). The final mixture was then dried on a 45×30 cm diameter double-drum drier, heated with steam to about 140° C. (284° F.). The drum-dried flakes were passed through a Retsch® mill, Model ZM-1, equipped with a 1 mm screen, to yield a powdered product. This powder was free-flowing and was not oily or sticky to the touch. After the addition of granular starch to the formulation, the final dry starch-lubricant product contained 28% lubricant, by weight.

Dry starch-lubricant compositions were prepared using one of the following lubricants: a base olefin, a high molecular weight base olefin, a high molecular weight base olefin with ester, olefin blends with ester, and finally a viscous, liquid polybutene (Amoco H40®; 3200 cSt at 40° C.). Starch-lubricant compositions were mixed at 14.25 kg/m$^3$ (5 lb/barrel) concentrations into a 1561 kg/m$^3$ (13.0 lb/gal) laboratory-prepared lignosulfonate drilling fluid (composition in Table 1) that is the base mud (control) in Table 2. After adding the starch-lubricant composition to the mud, each sample was hot rolled for 16 hours at 65.5° C. (150° F.). After the samples were cooled to room temperature, they were re-mixed and tested for API fluid loss, and high-temperature/high-pressure fluid loss at 121.1° C. (250° F.) and 500 psig differential pressure. Coefficient of friction measurements for each sample was obtained with a Westport/M-I HLT Lubricity Tester [metal-to-metal contact, 150 rpm, 125 lbf contact, 2 gal/min (7.56 L/min) circulation, 23.9° C. (75° F.)]. For comparison purposes, a 1333.1 kg/M$^3$ (11.1 lb/gal) water-based field mud (supplied by Baker Hughes INTEQ, obtained from Enron Oil and Gas Company, now EOG Resources) containing a hydrocarbon lubricant (3%) was tested as a reference fluid.

Coefficients of friction and fluid loss measurements for the field mud (containing 3% v/v lubricant) and drilling muds containing the five experimental starch-lubricant compositions are compared in Table 2 with the base mud (control) without any additives. This data clearly demonstrates the excellent lubricating qualities and fluid loss properties of compositions prepared according to this invention. Although liquid lubricants are typically added to mud formulations on a volume/volume basis (v/v), dry starch-lubricant products were added on a weight/volume basis. In the drilling muds prepared for these studies, the amount of dry starch-lubricant composition used was 5 lb/barrel. Since these starch-based lubricants contain 72% cornstarch and only 28% lubricant (by weight), the actual lubricant amount encapsulated as droplets in the mud was only 0.26% w/w or 0.5% v/v assuming a lubricant density of 0.8.

Table 2 shows that the field mud sample with 3% lubricant (v/v) had an average C.F. value of 0.30, which was similar to the laboratory-prepared base mud. Compared to the base mud, the first four fluids containing starch-lubricant compositions had lower C.F. values and provided a C.F. reduction of 12.6 to 22.8% from the base mud. These are significant reductions, especially because these formulations contain only about one-sixth the amount of lubricant present in the field mud. The starch-lubricant composition prepared from polybutene was even more impressive, and its addition to the mud formulation gave a C.F. value of 0.17 (a 46.5% reduction). This C.F. value is similar to that of a typical oil-based drilling mud (0.20) and far exceeded our expectations.

When lubricant was added to the mud directly, i.e., not encapsulated in starch, base olefin with 15% ester gave a C.F. value of 0.45 at 1% (v/v) in the mud, and a value of 0.21 at 3% (v/v). When the same lubricant encapsulated in starch was added to the mud, the C.F. value was 0.25 at a lubricant concentration of only 0.5% (Table 2).

Starch-based lubricant compositions of this invention not only provide good C.F. values but also impart good fluid loss properties to the mud formulations. Table 2 lists API fluid loss (room temperature, 100 psig) and HTHP fluid loss at 121.1° C. at 500 psig differential pressure. All starch-lubricant compositions exhibited better fluid loss control than either the base mud or the field mud. The starch-lubricant composition prepared from polybutene was particularly effective, and addition of this composition to the mud gave a fluid-loss reduction of 66.3% (API) and 61.5% (HTHP) from the base mud.

TABLE 1

Generic Lignosulfonate Drilling Fluid Composition
(Prepared in Fresh Water)

| COMPONENT | AMOUNT |
|---|---|
| Bentonite | 51.3 kg/m³ (18.0 pounds per barrel) |
| Ferrochrome lignosulfonate | 11.4 kg/m³ (4.0 pounds per barrel) |
| Ground lignite | 5.7 kg/m³ (2.0 pounds per barrel) |
| Sodium hydroxide | 3.56 kg/m³ (1.25 pounds per barrel) |
| Xanthan polymer | 1.43 kg/m³ (0.5 pounds per barrel) |
| Simulated drilled solids | 42.75 kg/m³ (15.0 pounds per barrel) |
| Barite | 658.35 kg/m³ (231 pounds per barrel) |

TABLE 2

Coefficient of Friction (C.F.) and
Fluid Loss Values of Drilling Fluids
Containing Starch-Lubricant Composites

| Example Number | Drilling Fluid | Coefficient of Friction | Percent Reduction from Control | Fluid Loss Values[1] API Filtrate ml | Fluid Loss Values[1] HTHP @ 250° F. ml |
|---|---|---|---|---|---|
| — | base mud (control) | 0.3126 | — | 8.0 | 26 |
| — | field mud, 3% lubricant[2] | 0.2981 | 4.6 | 4.4 | 14 |
| 1 | base mud + starch composite with 0.5% high MW[3] olefin[4] | 0.2732 | 12.6 | 3.1 | 12 |
| 2 | base mud + starch composite with 0.5% base olefin[4] | 0.2653 | 15.1 | 3.4 | 11 |
| 3 | base mud + starch composite with 0.5% high MW olefin + ester[4] | 0.2551 | 18.4 | 3.0 | 13 |
| 4 | base mud + starch composite with 0.5% base olefin + ester olefin copolymer[4] | 0.2473 | 20.9 | 3.2 | 12 |
| 5 | base mud + starch composite with 0.5% polybutene[4] | 0.1672 | 46.5 | 2.7 | 10 |

[1]Fluid loss values were obtained according to: "Recommended Practice Standard Procedure for Laboratory Testing Drilling Fluids", API Recommended Practice 131, Sixth Edition, May 2000, pages 17–21.
[2]v/v. This is equivalent to 1.56% (w/w), assuming a nominal density of 0.8 for the lubricant.
[3]MW = molecular weight.
[4]v/v. This is equivalent to 0.26% (w/w), assuming a nominal density of 0.8 for the lubricant.

We claim:

1. A drilling fluid lubricant comprising a water-immiscible material stably and substantially uniformly distributed in a starch phase in the absence of an external emulsifier, wherein said starch phase consists essentially of completely disrupted starch granules and wherein said water-immiscible material is characterized by a semi-solid or highly viscous and/or high molecular weight copolymeric lubricant having a pour point within the range of about 20° C. to about −25° C., a molecular weight of at least 280 and is selected from the group consisting of saturated hydrocarbons, olefinic hydrocarbons, organic esters, polyolefins, and copolymers of α,β-unsaturated dicarboxylic acid esters and olefinically unsaturated compounds.

2. The drilling fluid lubricant of claim 1, wherein said water-immiscible material is polybutene.

3. The drilling fluid lubricant of claim 1, wherein said water-immiscible material is a copolymer of α,β-unsaturated dicarboxylic acid ester and olefinic hydrocarbons with a molecular weight in the range of 2000–4500.

4. The drilling fluid lubricant of claim 1, wherein said water-immiscible material is present at a level of 5 to 100 parts by weight per 100 parts starch.

5. The drilling fluid lubricant of claim 1, wherein said water-immiscible material is present at a level of 20 to 50 parts by weight per 100 parts starch.

6. The drilling fluid lubricant of claim 1, wherein said lubricant is an aqueous emulsion.

7. The drilling fluid lubricant of claim 1, wherein said lubricant is a dried solid.

8. The drilling fluid lubricant of claim 1 wherein said starch is selected from the group consisting of cornstarch, wheat starch, rice starch, potato starch, tapioca starch, and mixtures thereof.

9. The drilling fluid lubricant of claim 1 further comprising non-jet cooked, gelatinized starch, uniformly distributed in said starch phase and added in an amount sufficient to provide a drilling fluid lubricant containing 10–20% non-jet cooked starch, by weight, in the total starch-lubricant composition on a dry weight basis.

10. A drilling fluid lubricant comprising polybutene stably and substantially uniformly distributed in a starch phase in the absence of an external emulsifier, wherein said starch paste consists essentially of completely disrupted starch granules.

11. The drilling fluid lubricant of claim 10, wherein said polybutene is present at a level of 5 to 100 parts by weight per 100 parts starch.

12. The drilling fluid lubricant of claim 10, wherein said polybutene is present at a level of 20 to 50 parts by weight per 100 parts starch.

13. The drilling fluid lubricant of claim 10, wherein said lubricant is an aqueous emulsion.

14. The drilling fluid lubricant of claim 10, wherein said lubricant is a dried solid.

15. The drilling fluid lubricant of claim 10 wherein said starch is selected from the group consisting of cornstarch, wheat starch, rice starch, potato starch, tapioca starch, and mixtures thereof.

16. The drilling fluid lubricant of claim 10 further comprising non-jet cooked, gelatinized starch, uniformly distributed in said starch phase and added in an amount sufficient to provide a drilling fluid lubricant containing 10–20% non-jet cooked starch, by weight, in the total starch-lubricant composition on a dry weight basis.

17. A drilling mud comprising the drilling fluid lubricant of claim 1.

18. A drilling mud comprising the drilling fluid lubricant of claim 2.

19. A drilling mud comprising the drilling fluid lubricant of claim 3.

20. A drilling mud comprising the drilling fluid lubricant of claim 9.

21. A drilling mud comprising the drilling fluid lubricant of claim 10.

22. A drilling mud comprising the drilling fluid lubricant of claim 16.

* * * * *